US012721466B2

(12) United States Patent
Bodum

(10) Patent No.: US 12,721,466 B2
(45) Date of Patent: Sep. 1, 2026

(54) FILTER DEVICE FOR FILTERING INSOLUBLE MATERIAL

(71) Applicant: Pi-Design AG, Baar (CH)

(72) Inventor: Jorgen Bodum, Meggen (CH)

(73) Assignee: PI-DESIGN AG, Triengen (CH)

( * ) Notice: Subject to any disclaimer, the term of this patent is extended or adjusted under 35 U.S.C. 154(b) by 606 days.

(21) Appl. No.: 18/266,558

(22) PCT Filed: Dec. 6, 2021

(86) PCT No.: PCT/EP2021/084414
§ 371 (c)(1),
(2) Date: Jun. 9, 2023

(87) PCT Pub. No.: WO2022/122660
PCT Pub. Date: Jun. 16, 2022

(65) Prior Publication Data

US 2025/0280988 A1 Sep. 11, 2025

(30) Foreign Application Priority Data

Dec. 11, 2020 (DE) ..................... 10 2020 133 229.7

(51) Int. Cl.
*A47J 31/06* (2006.01)
*A47J 31/20* (2006.01)

(52) U.S. Cl.
CPC ............... *A47J 31/06* (2013.01); *A47J 31/20* (2013.01)

(58) Field of Classification Search
CPC .................................. A47J 31/06; A47J 31/20
See application file for complete search history.

(56) References Cited

U.S. PATENT DOCUMENTS

| | | | | |
|---|---|---|---|---|
| 10,045,652 | B2 * | 8/2018 | Bodum | A47J 31/20 |
| 2018/0084939 | A1 | 3/2018 | Ren et al. | |
| 2020/0039738 | A1 * | 2/2020 | Duman | A47J 31/0615 |
| 2020/0107667 | A1 | 4/2020 | Ayres | |

FOREIGN PATENT DOCUMENTS

| | | | |
|---|---|---|---|
| DE | 8900513 | U1 | 3/1989 |
| EP | 1260165 | A1 | 11/2002 |
| EP | 3132724 | A1 | 2/2017 |
| JP | S27-006487 | | 7/1952 |
| JP | 3020760 | U | 2/1996 |
| JP | 3050522 | U | 7/1998 |
| JP | 2009523506 | A | 6/2009 |
| JP | 3174808 | U | 4/2012 |
| JP | 2018531657 | A | 11/2018 |
| JP | 3229558 | U | 12/2020 |
| WO | 2007082391 | A1 | 7/2007 |
| WO | 2014140418 | A1 | 9/2014 |
| WO | 2018194450 | A1 | 10/2018 |

OTHER PUBLICATIONS

Japanese Office Action in JP2023-535641 E issued Apr. 17, 2024.
International Search Report issued Apr. 28, 2022 in PCT/EP2021/084414.

* cited by examiner

*Primary Examiner* — Youngsul Jeong
(74) *Attorney, Agent, or Firm* — Panitch Schwarze Belisario & Nadel LLP

(57) ABSTRACT

A filter device for filtering insoluble material which is used in the preparation of beverages, in particular for filtering tea leaves or ground coffee, includes a steel body having a plurality of filter openings and a plastic part composed of an injection-moldable plastic. The plastic part includes a connecting portion that may be injection-molded around the steel body. A recess is located in the connecting portion. The recess is at least partially filled by the plastic part or the steel body forms an extension in the connecting portion. The extension projects from the steel body and is at least partially enclosed by the plastic part.

17 Claims, 9 Drawing Sheets

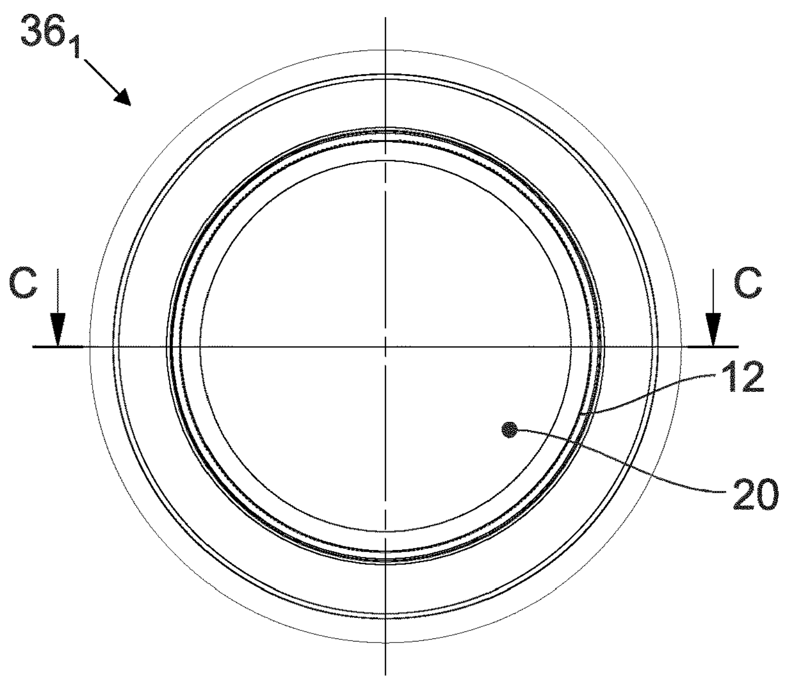
Fig.2C
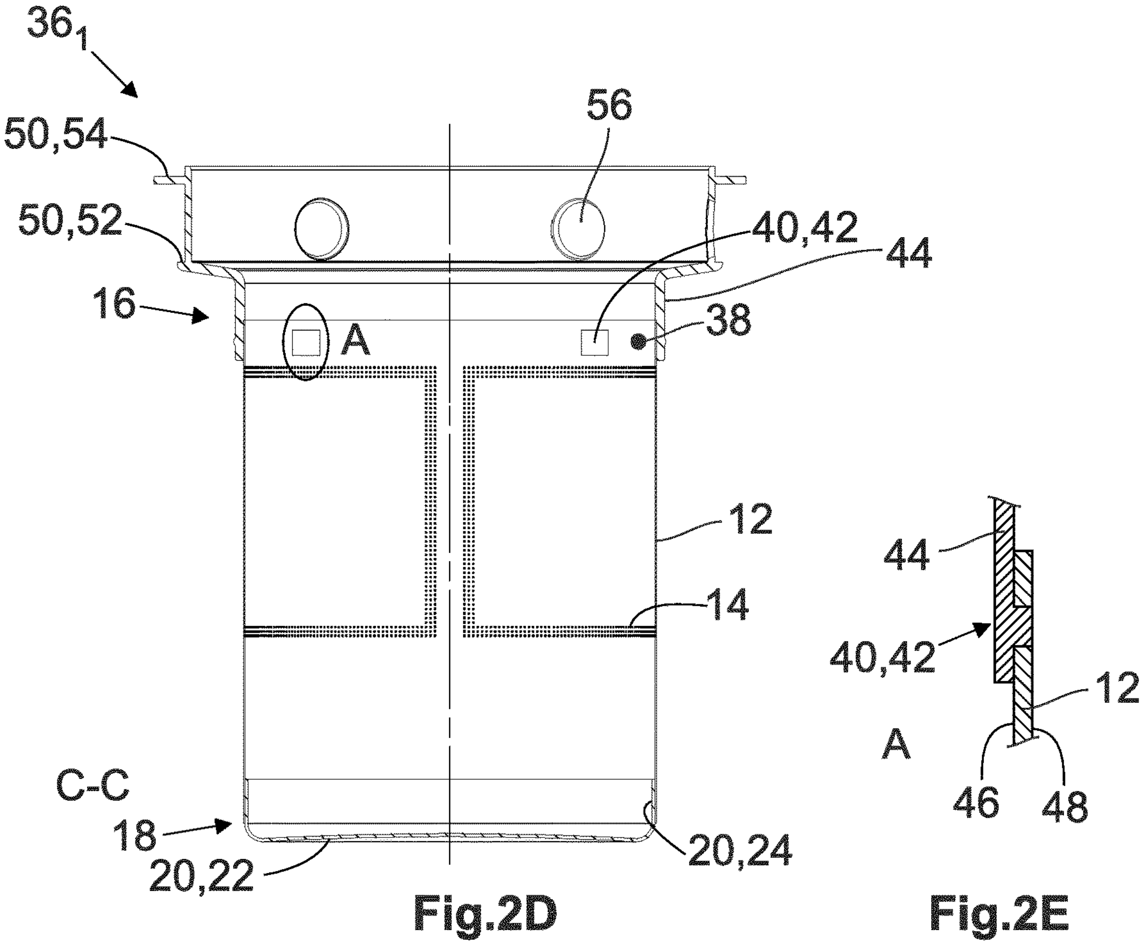
Fig.2D
Fig.2E

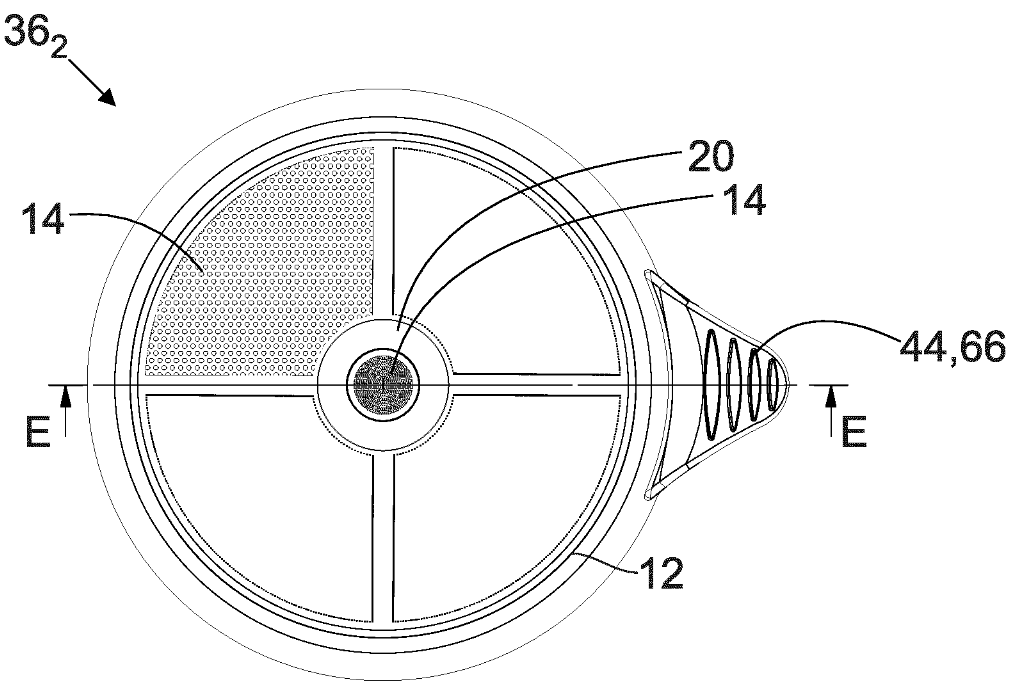
Fig.3C
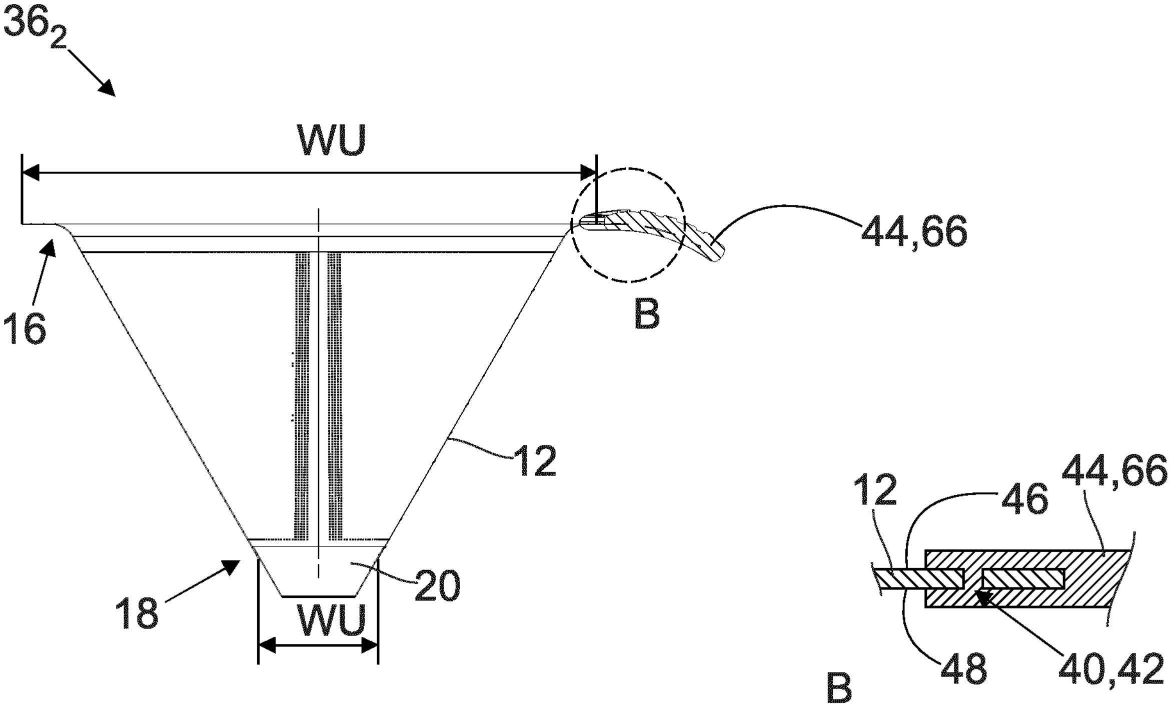
Fig.3D
Fig.3E

FILTER DEVICE FOR FILTERING INSOLUBLE MATERIAL

CROSS-REFERENCE TO RELATED APPLICATIONS

This application is a Section 371 of International Application No. PCT/EP2021/084414, filed Dec. 6, 2021, which was published in the German language on Jun. 16, 2022 under International Publication No. WO 2022/122660 A1, which claims priority under 35 U.S.C. § 119(b) to German Application No. 10 2020 133 229.7, filed Dec. 11, 2020, the disclosures of which are incorporated herein by reference in their entireties.

BACKGROUND OF THE INVENTION

The present invention relates to a filter device for filtering insoluble material. Such filter devices are in particular used to prepare coffee and tea. The filter device has a tubular steel body having a plurality of filter openings. A base steel body is welded to said steel body and can likewise have a plurality of filter openings, but is frequently closed.

To prepare coffee or tea, the ground coffee or the tea leaves is/are filled into the filter device, the filter device is inserted into an insertion opening of a vessel, for example into a coffee pot, teapot, or filter holder, and boiling water is subsequently poured into the filter device. The boiling water comes into contact with the ground coffee or tealeaves and extracts aromatics in so doing. The coffee or tea is prepared after a certain contact time between the water and the ground coffee or the tealeaves so that the filter device can be removed from the coffee pot, teapot, or filter holder and the coffee or tea can be poured into a cup.

A particular application is the use of so-called filter presses that are described, for example, in WO 2017/080885. A filter piston is introduced into the steel body from above in them and is pressed toward the base steel body. The base steel body does not have any filter openings in this application. The steel body also typically does not have any filter openings adjacent to the base steel body. If the filter piston is moved in the direction of the base steel body, the ground coffee or the tealeaves collect(s) in the region of the base steel body and can then not come into contact with the water or can only come into contact with it to a negligibly small extent. In addition, the ground coffee or the tealeaves move does/do not move into the coffee pot or tea pot. The extraction of the ground coffee or of the tealeaves is largely ended by the pressing down of the filter piston.

On the use of filter pistons, the filter device typically remains in the coffee pot or teapot for so long until they have been completely emptied. If the coffee or the tea is to be poured from the coffee pot or the teapot into a cup, there is the risk that the filter device can fall out of the coffee pot or teapot in so doing.

A filter device is known from WO 2007/082391 A1 that has radially outwardly facing bulges at the upper margin that are formed by a plastic part that is fastened to an upper steel body, with the upper steel body being welded to the steel body. In this respect, the plastic part is formed such that the bulges have a certain elasticity or yield. The filter device can be tensioned with the insertion opening of the coffee pot or teapot at the upper margin to avoid the falling out of the filter device on the pouring of coffee or tea into a cup. The bulges can furthermore deform to a greater or lesser extent so that the filter device can adapt within certain limits to different sizes of the insertion opening and to tolerance differences, in particular with coffee pots or teapots composed of glass.

It results from the above statements that the filter device in accordance with WO 2007/082391 A1 has a total of three steel bodies so that consequently two weld seams are required to connect the three steel bodies to one another. It must be noted at this point that a weld seam is also required in the manufacture of the steel body from a flat material to convert the flat material into a cylindrical shape, but it does not serve to connect the three steel bodies to one another.

To provide a sufficiently stable connection between the upper steel body and the plastic part, the upper steel body additionally has to be provided with a flange. The manufacture of the filter device is hereby comparatively complicated and consequently expensive.

BRIEF SUMMARY OF THE INVENTION

It is an object of the present invention to provide a filter device for filtering insoluble material that can be produced more simply in comparison with the filter devices known from the prior art.

This object is achieved by the features specified in claim 1. Advantageous embodiments of the invention form the subject matter of the dependent claims.

An embodiment of the invention relates to a filter device for filtering insoluble material that is used in the preparation of beverages, in particular for filtering tealeaves or ground coffee, comprising

- a steel body having a plurality of filter openings;
- at least one plastic part from an injection moldable plastic that is injected around the steel body in a connection section of the steep body, wherein
  - at least one recess is arranged in the connection section and is at least partially filled by the plastic part; or
  - the steel body in the connection section forms a prolongation that projects from the steel body and that is at least partially surrounded by the plastic part.

It is possible with the proposed filter device to establish a direct connection between the plastic part and the steel body. In this respect, the plastic part engages into the recesses and at least partially fills them or the plastic part surrounds the prolongation, whereby an undercut and consequently a shape match is established between the plastic part and the steel body. The steel body only has to be correspondingly placed into an injection molding tool for this purpose. In the filter device in accordance with the proposal, the upper steel body is replaced with the plastic part with respect to WO 2007/082391 A1. It is therefore no longer necessary to provide an additional weld seam to connect the upper steel body to the steel body. It is also no longer necessary to provide the upper steel body with a flange. The production is hereby simplified and therefore becomes less expensive.

In accordance with a further embodiment, the recess can be formed complete as a passage opening completely passing through the steel body. In this embodiment, the recess can be manufactured comparatively simply and inexpensively by stamping, for example. In addition, the size of the undercut is maximized. The connection between the plastic part and the steel body is strengthened as a result.

In a further developed embodiment

- the steel body can have a first side and a second side;
- the passage opening can pass through the steel body from the first side to the second side; and
- the plastic part can be injected around the steel body at the first side and at the second side and can completely fill the passage opening.

In this embodiment, the plastic part contacts both the first side and the second side at the steel body. In addition, the passage opening is completely passed through by the plastic part. A particularly resilient connection is hereby provided between the plastic part and the steel body.

In a further developed embodiment, the steel body can have an upper margin and a lower margin;

the upper margin can radially outwardly project from the remaining steel body and surround a filling opening;

the connection section can be formed by the upper margin; and the plastic part can be arranged at the upper margin.

In this embodiment, the plastic part can be radially outwardly attached so that it is easily accessible. As initially mentioned, boiling water is poured into the filter device to bring it into contact with ground coffee or tealeaves. The filter device can consequently also heat up. The risk of burns to a user who grips the filter device with his hand is reduced due to the lower thermal conductivity of the plastic part in comparison with the steel body.

In accordance with a further developed embodiment, the plastic part comprises a first plastic and a second plastic, with the first plastic filling the recess or surrounding the prolongation and the second plastic at least partially surrounding the first plastic. Due to the use of two different plastics, that are both preferably capable of injection molding, their properties can be ideally used for their objects. The first plastic establishes the connection between the plastic part and the steel body so that the first plastic should in particular also have high shape faithfulness with changing temperatures. The second plastic is that plastic that is gripped by a user. To this extent, the second plastic can be selected according to aspects of haptics and optics.

In accordance with a further embodiment, the first plastic has a lower hardness than the second plastic and/or the second plastic has a smaller thermal conductivity than the first plastic. As mentioned, the first plastic forms the connection of the plastic part to the steel body. A particularly long-lasting connection can be provided between the plastic part and the steel body with a harder plastic. In contrast to this, a softer plastic has haptics that are more pleasant for the user. As initially mentioned, the filter device is placed on or inserted into a coffee pot or teapot. A softer plastic can adapt to the shape of the coffee pot or teapot to a certain degree in the contact region so that an unintended slipping is at least made more difficult, whereby operating safety is increased.

The smaller thermal conductivity of the second plastic provides that the plastic part also only heats up to a small degree at the point where the user grips the filter device when boiling water is poured onto the insoluble material. To this extent, the likelihood of burning the hands of the users on a use of the device is considerably reduced.

These conditions are satisfied, for example, when polypropylene (PP) is used as the first plastic and a thermoplastic elastomer (TPE) as the second plastic.

In a further embodiment, the upper margin can have an upper marginal width and the lower margin can have a lower marginal width, with the upper marginal width being larger than the lower marginal width. In this embodiment, the steel body can approximately have the form of a truncated cone or of a truncated pyramid. It has additionally been found that a backing up of the water in the filter device is avoided or at least slowed down due to the frustoconical or frustopyramidal design of the steel body.

A further developed embodiment can be characterized in that a base steel body is welded to the steel body at the lower margin. To prevent the ground coffee or the tealeaves from moving over the lower margin into the coffee pot or teapot, it must be ensured that the steel body is closed in the region of the lower margin. For technical production reasons, the steel body can be terminated most simply by a base steel body in the region of the lower margin.

In accordance with a further embodiment, the base steel body can have a base wall and at least one side wall, with the base wall being provided with a plurality of filter openings or with the base wall surrounding a base opening that is covered by a base plate having a plurality of filter openings. To be able to design the extraction of the ground coffee or tealeaves in as optimum a manner as possible, the dwell time of the boiling water in the filter device should be neither too short nor too long. In addition, a backing up or even a clogging of the steel body should be prevented. It has been found that the provision of the base will with a plurality of filter openings with a simultaneous design of the side wall without filter openings can increase the dwell time of the boiling water within the filter device, but without risking a backing up of the water or a clogging of the steel body. A small increase of the dwell time results in a more intensive or stronger coffee or tea without it becoming too bitter. The base steel body can be designed in one part or in two parts. The base plate can be smooth, whereby the production of the filter openings is simplified in comparison with the one-part design, for example because the wall thickness of the base plate can be selected independently of the remaining base steel body. The wall thickness of the base plate can in particular be smaller than that of the remaining base steel body, whereby the production of the filter openings can be simplified and accelerated.

It may be suitable in a further embodiment that the steel body has a first side and a second side;

the passage opening passes through the steel body from the first side to the second side; and the plastic part

- is injected around the steel body at the first side, with the plastic part terminating flush with the second side in the region of the passage opening; or
- is injected around the steel body at the second side, with the plastic part terminating flush with the first side in the region of the passage opening; or the plastic part

- is injected around the steel body at the first side and the prolongation projects over the first side; or
- is injected around the steel body at the second side and the prolongation projects over the second side.

In this embodiment, the plastic part only surrounds the steel body from one side. In addition, the plastic part terminates flush with that side that is not surrounded by the plastic part in the region of the passage opening. The side not surrounded by the plastic part consequently does not have any depressions or elevated portions. The adhesion of ground coffee or tealeaves is hereby prevented so that the cleaning of the filter device is kept simple.

In accordance with a further embodiment, the steel body can have an upper margin and a lower margin;

the upper margin can surround a filling opening;

the connection section can be formed by the upper margin; and the plastic part can be arranged at the upper margin.

The arrangement of the plastic part at the upper margin makes it possible for the user also to safety grip the filter device when it has been heated up by the boiling water.

In a further developed embodiment, the filter device can comprise a further plastic part and the plastic part can at least have reception sections for a further plastic part that is injected around the plastic part.

The provision of a further plastic part makes it possible to provide the filter device with further functions. The further plastic part can, for example, form an eye or the like by which the filter device can be hung on a hook. The filter device can hereby be easily stored in a kitchen, for example. The plastic part that is connected to the steel body does not have to be modified for this. To this extent, different variants of the filter device can be provided with comparatively simple means.

In a further developed embodiment, the plastic part can have a plurality of apertures arranged outside the steel body and the further plastic part can have the same number of projections that are arranged adjacent to the apertures. The projections can be designed as resilient so that the filter device can be inserted into the insertion opening of a coffee pot or teapot, with the projections being deformed. In this respect, a certain friction is generated between the projections and the insertion opening of the coffee pot or teapot, whereby the falling out of the filter device from the coffee pot or teapot is prevented. The projections can furthermore be deformed more or less. Size differences of the insertion openings of the coffee pots or teapots can therefore be bridged. Comparatively large tolerance differences, which can be compensated by the projections, in particular result in the region of the insertion openings when the coffee pots or the teapots are made of glass. The filter device can also be used for different coffee pots or teapots within certain limits in accordance with this embodiment.

In a further embodiment, a closed base steel body can be welded to the teel body at the lower margin. As already mentioned, the steel body can be closed particularly easily at the lower margin using a base steel body. The closing is necessary to prevent ground coffee or tealeaves from entering into the coffee pot or teapot.

A further developed embodiment can be characterized in that the plastic part is formed as a handle piece or forms a handle piece. The design of the plastic part as a handle piece facilitates the handling of the filter device. The risk of a user burning his hands when gripping the filter device is considerably reduced due to the lower thermal conductivity of plastic over steel.

BRIEF DESCRIPTION OF THE SEVERAL VIEWS OF THE DRAWING

Exemplary embodiments of the invention will be explained in more detail in the following with reference to the enclosed drawings. There are shown

FIG. 2C is a lower plan view of the filter device in accordance with the preferred invention in a second state of manufacture;

FIG. 2D is a cross-sectional view of the filter device shown in FIG. 2C along the sectional plane C-C defined in FIG. 2C;

FIG. 2E is a basic cross-sectional enlarged representation, not to scale, of the region A marked in FIG. 2D;

FIG. 3C is a plan view of the filter device shown in FIG. 3B;

FIG. 3D is a cross-sectional representation through the filter device shown in FIG. 3B taken along the sectional plane E-E defined in FIG. 3C;

FIG. 3E is a basic enlarged cross-sectional representation, not to scale, of the region B marked in FIG. 3D;

DETAILED DESCRIPTION OF THE INVENTION

Figure 1A:
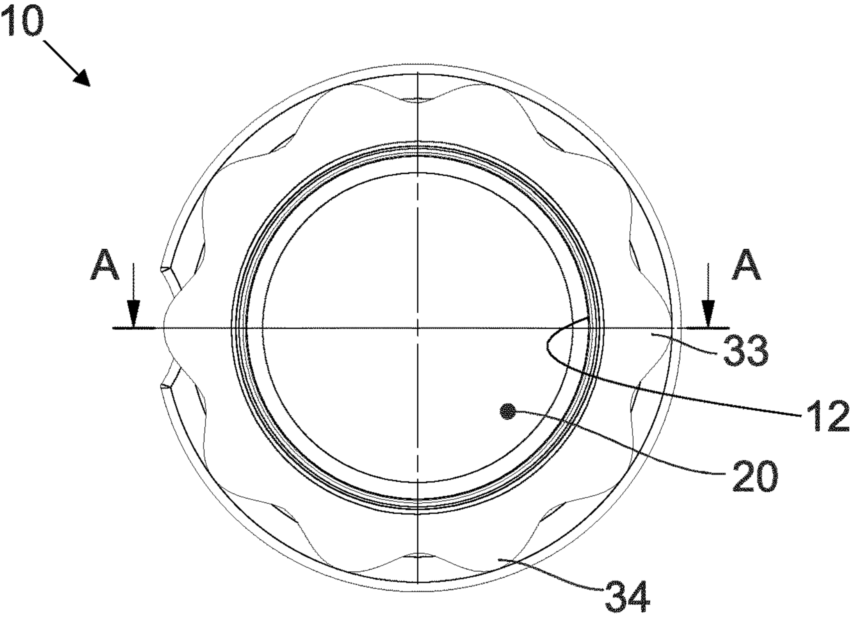
FIG. 1A is a lower plan view of a filter device in accordance with the prior art.
Figure 1B:
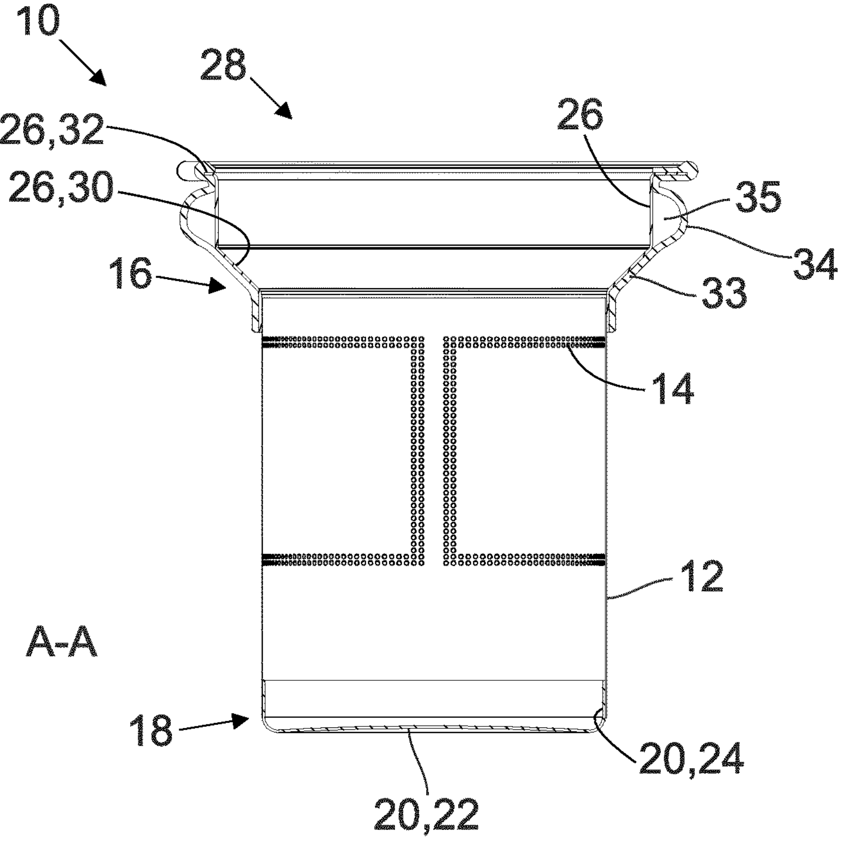
FIG. 1B is a cross-sectional view of the filter device shown in FIG. 1A along the sectional plane A-A defined in FIG. 1A.

A filter device 10 known from W 2007/082391 A1 is shown with reference to two different views in FIGS. 1A and 1B. The filter device 10 has a steel body 12 that is provided with a plurality of filter openings 14. Only some of the filter openings 14 are shown in FIG. 1B for reasons of clarity. However, the regions that are bounded by the filter openings 14 in FIG. 1A are completely provided with further filter openings 14.

The steel body 12 substantially extends cylindrically and can be produced by bending from a planar metal sheet. The filter openings 14 can consequently be stamped, etched, or produced in a similar manner. Etching is in particular suitable since the steel body has a small wall thickness (<1 mm). The steel body 12 has an upper margin 16 and a lower margin 18. A base steel body 20 is welded to the steel body 12 at the lower margin 18. The base steel body 20 has a base wall 22 that is, however, not provided with filter openings 14. The base steel body 20 additionally has a side wall 24 that also does not form any filter openings 14. The side wall 24 of the base steel body 20 projects into the steel body 12 by which the base steel body 20 is welded to the base steel body 20 at the side wall 24, An upper steel body 26 is welded to the steel body 12 at the upper margin 16. The upper steel body 26 forms a filling opening 28 through which ground coffee, tealeaves, or the like as well as water can be poured into the filter device 10. The upper steel body 26 additionally has a funnel-like section 30 and a flange 32 to which a plastic body 33 is fastened. The plastic body 33 contacts the upper steel body 12 with the exception of bulges 34. A respective hollow space 36 is therefore formed between the bulges 34 and the plastic body 33 so that the plastic body 33 has greater resilience in the region of the bulges 34 than in the remaining region.

If the filter device 10 is inserted into an insertion opening of a coffee pot or teapot (not shown), the bulges 34 are deformed so that frictions acts between the insertion opening and the bulges 34. As a result, the filter device 10 is tensioned with the coffee pot or teapot so that a falling out of the filter device 10 when pouring coffee or tea into a cup is prevented. The bulges 34 can furthermore deform to a greater or lesser extent so that the filter device 10 can adapt within certain limits to different sizes of the insertion opening of the coffee pot or teapot.

Figure 2A:
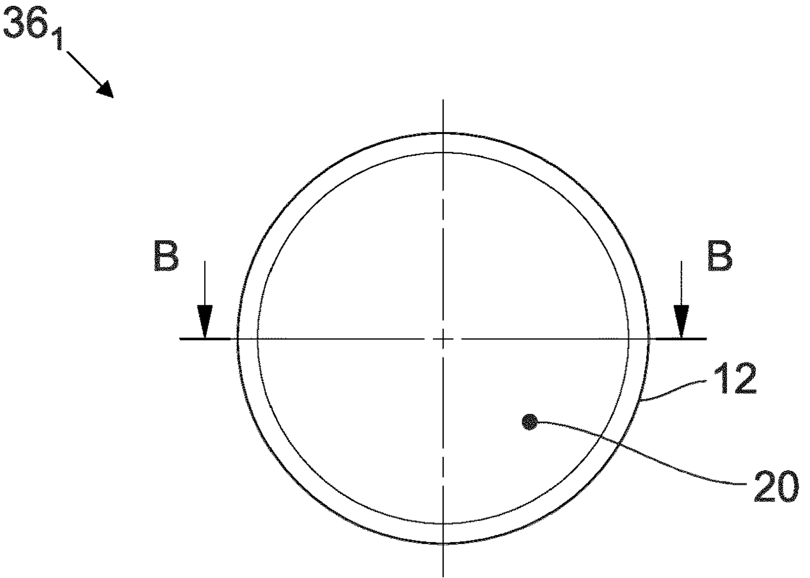
FIG. 2A is a lower plan view of a filter device in accordance with the preferred invention in accordance with a first embodiment in a state of manufacture.
Figure 2B:
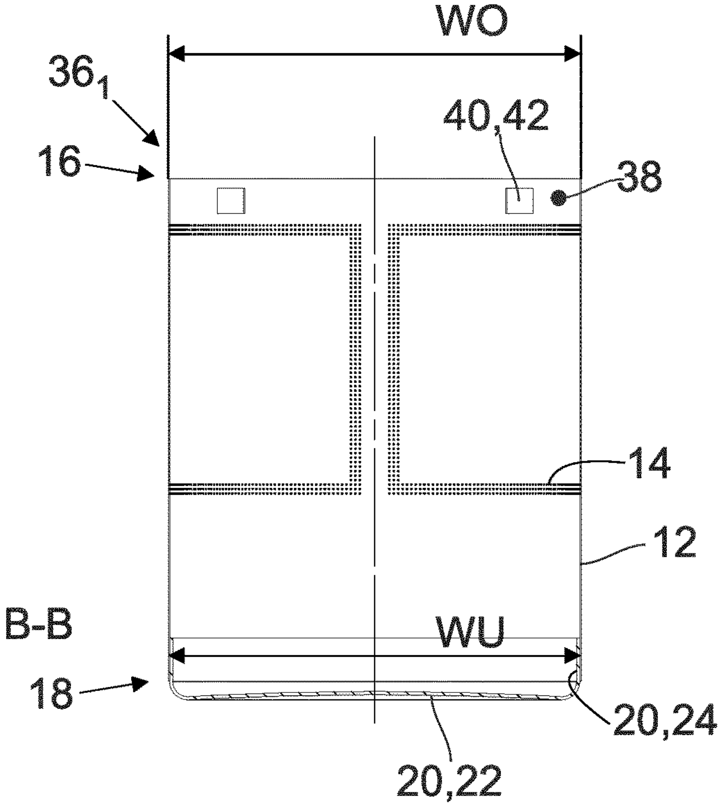
FIG. 2B is a cross-sectional view of the filter device shown in FIG. 2A along the sectional plane B-B defined in FIG. 2A.

A first embodiment of a filter device $\mathbf{36}_1$ in accordance with the invention is shown in a first state of manufacture in FIGS. 2A and 2B. As also the filter device $\mathbf{36}_1$ shown in FIGS. 1A and 1B, the filter device $\mathbf{36}_1$ in accordance with the invention comprises a steel body 12 having a plurality of filter openings 14. Only some of the filter openings 14 are also shown in this case, with the area of the steel body 12 bounded by the filter openings 14 being completely provided with filter openings 14. The steel body 12 has a substantially cylindrical shape with an upper margin 16 having an upper marginal width WO and with a lower margin 18 having a lower marginal width WU, with the upper marginal width WO approximately corresponding to the lower marginal width WU. The filter device $\mathbf{36}_1$ in accordance with the first embodiment is therefore suitable for the use of filter presses.

A base steel body 20 is welded to the steel body 12 at the lower margin 18. The base steel body 20 has a base wall 22 that is not provided with filter openings 14. The base steel body 20 furthermore has a side wall 24 that also does not form any filter openings 14. The side wall 24 of the base steel body 20 is welded to the steel body 12.

At the upper margin 16, the steel body 12 forms a connection section 38 in which a total of four recesses 40 are arranged that are formed in the shown embodiment of the filter device $\mathbf{36}_1$ as a passage opening 42 having a quadrangular cross-section and completely passing through the steel body 12.

The filter device 361 shown in FIGS. 2A and 2B is in a second state of manufacture in FIGS. 2C and 2D. A plastic part 44 of a plastic capable of injection molding, for example polypropylene (PP), is injected around the steel body 12 in the connection section 38 at the upper margin 16. The steel body 12 here has a first side 46 and a second side 48, with the first side 46 being the outer side and the second side 48 being the inner side of the steel body 12 in the embodiment shown. The plastic part 44 is injected around the steel body 12 at the first side 46, with the plastic part 44 projecting into the passage opening 42. The plastic part 44 here terminates flush with the second side 48 of the steel boy 12 as is shown with reference to a basic representation in FIG. 2E. FIG. 2E shows the region A marked in FIG. 2D in a form not to scale and very simplified.

The plastic part 44 furthermore forms a reception section 50 that comprises a lower radial extension 52 and an upper radial extension 54 in the embodiment shown, with the upper radial extension 54 extending further radially outwardly than the lower radial extension 52. The plastic part 44 is furthermore provided with a total of four apertures 56 that completely pass through the plastic part 44.

Figure 2F:
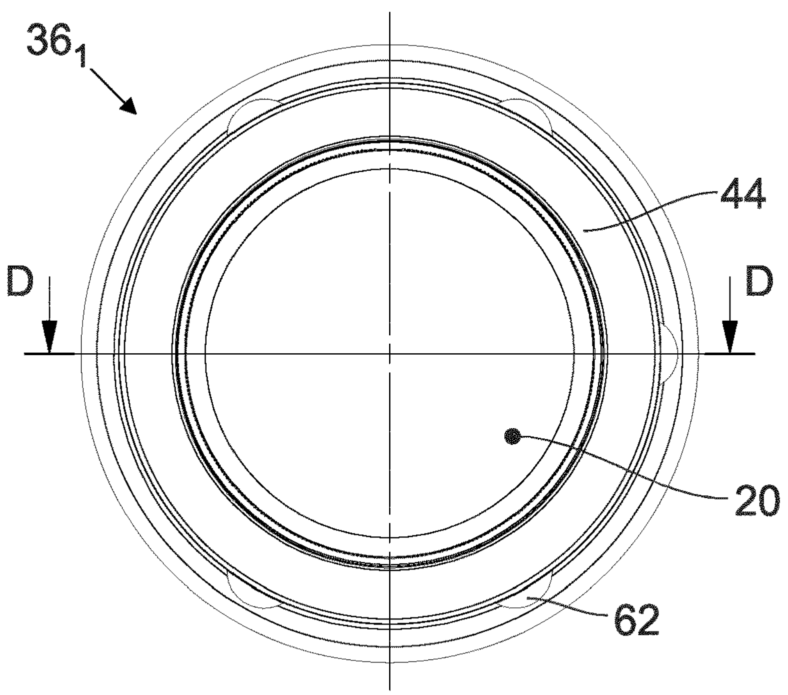
FIG. 2F is a lower plan view of the filter device in accordance with the preferred invention in a third, completed state of manufacture.
Figure 2G:
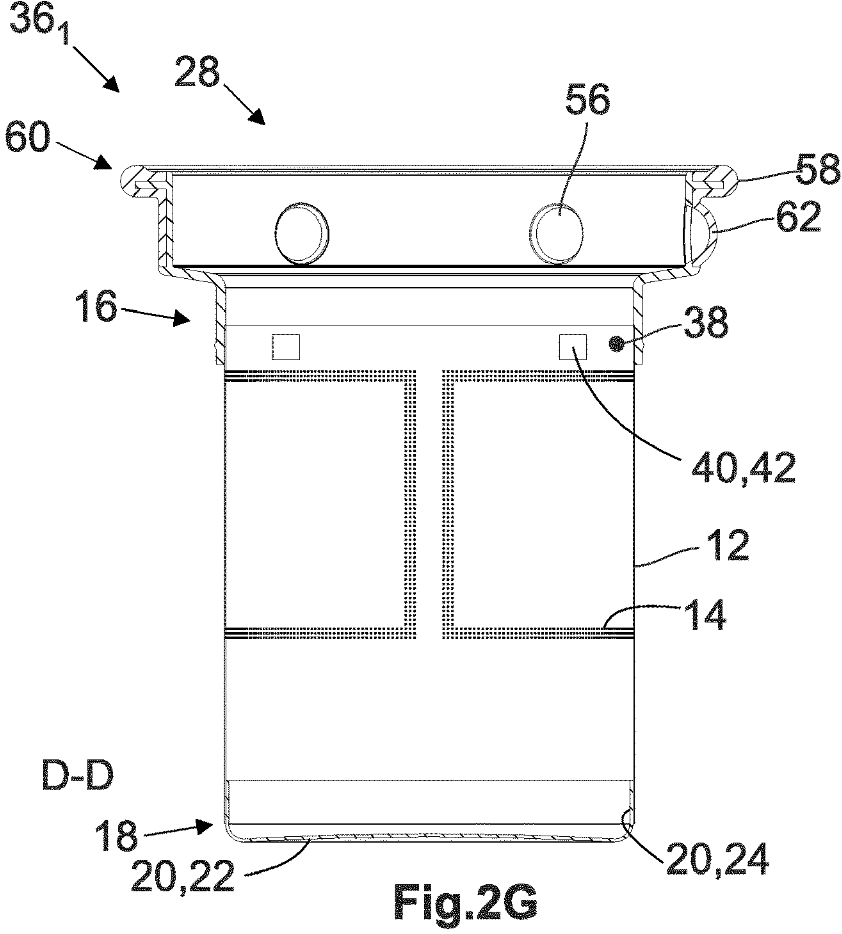
FIG. 2G is a cross-sectional view of the filter device shown in FIG. 2F taken along the sectional plane D-D defined in FIG. 2F.

The filter device $\mathbf{36}_1$ is shown in the completed state in FIGS. 2F and 2G. A further plastic part 58 is injected around the plastic part 44, with the further plastic part 58 of the lower radial extension adjoining toward the top and completely surrounding the upper radial extension 54. The further plastic part 58 can be produced from a thermoplastic elastomer (TPE). The TPE can be selected with reference to the hardness, for example. In the present case, a TPE could be selected that has a hardness between 50 and 68 Shore A, in particular 54 Shore A. Styrene-acrylonitrile (SAN) could be used as an alternative. In the region of the upper radial extension 58, the further plastic part 58 forms a support margin 60 by which the filter device 361 can be placed onto a coffee pot or teapot.

The further plastic part 58 has a respective projection 62, that extends radially outwardly, in the regions in which the apertures 56 are located. While the further plastic part 58 directly contacts the plastic part 44 radially outwardly and consequently comes into contact with the plastic part 44, this contact is canceled in the region of the projections 62 and the apertures 56. As a result, the further plastic part 58 has increased resilience or yield in the region of the projections 62 than in the remaining region.

It results from this description that the filter device $\mathbf{36}_1$ in accordance with the first embodiment has the base steel body 20 and the steel body 12 that have to be welded to one another. In contrast to the filter device 10 shown in FIGS. 1A and 1B, there is therefore no steel body and therefore no second weld seam to connect the steel body 12 to the no longer present steel body. The plastic part 44 and the further plastic part 58 can be produced using the same injection molding tool without the position of the steel body 12 in the injection molding tool having to be changed. The production of the filter device $\mathbf{36}_1$ in accordance with the first embodiment is therefore considerably simpler and less expensive than the production of the filter device 10 shown in FIGS. 1A and 1B.

The filter device $\mathbf{36}_1$ can be inserted into an insertion opening of a coffee pot or teapot (not shown), with the projections 62 being deformed more or less. As a result, friction acts between the insertion opening and the projections 62, whereby the filter device $\mathbf{36}_1$ is fixed with respect to the coffee pot or teapot. A falling out of the filter device $\mathbf{36}_1$ from the coffee pot or teapot can hereby be prevented.

Figure 3A:
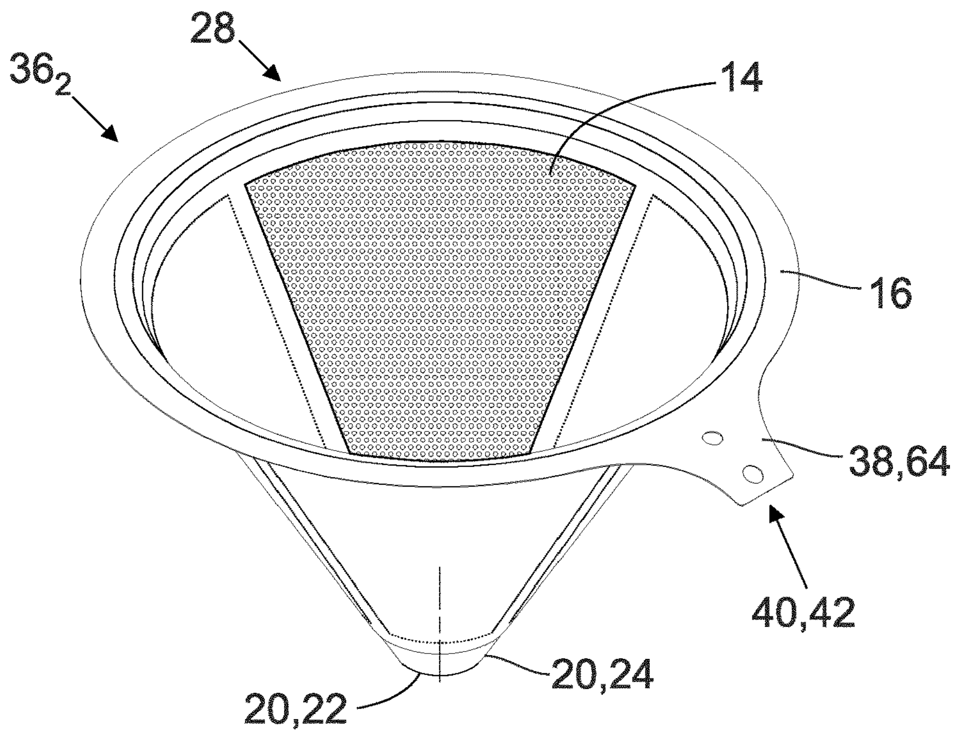
FIG. 3A is a side perspective representation of a second embodiment of the filter device in accordance with the preferred invention in a first state of manufacture.

FIGS. 3A to 3D show a second embodiment of the filter device $\mathbf{36}_2$ in accordance with the invention. FIG. 3A shows the filter device $\mathbf{36}_2$ in a first state of manufacture. As also in the first embodiment, the steel body 12 is provided with a plurality of filter openings 14 that are only shown in part in FIGS. 3A to 3D and only generally in FIGS. 3A to 3D. The filter openings 14 can have a diameter of approximately 0.2 mm or greater.

In this case, the upper marginal width WO of the upper margin 16 is greater than the lower marginal width WU of the lower margin 18. In the embodiment shown, the steel body 12 therefore has a frustoconical form. A base steel body 20 is welded at the lower margin 18 to the steel body 12 that likewise has the form of a truncated cone. The base steel body 20 has a base wall 22 and a side wall 24, with the base wall 22, as can be recognized, for example, from FIG. 3C, being provided with a plurality of filter openings 14. The side wall 24 of the base steel body 24 does not have any filter openings 14, however. The dwell time of the hot water in the filter device $36_1$ can be determined by the number and diameter of the filter openings 14. As mentioned, the filter openings 14 have a diameter of approximately 0.2 mm so that they are comparatively small. In comparison with larger filter openings 14, the volume flow through the steel body 12 is hereby reduced so that the dwell time of the hot water is increased. The fact that the side wall 24 of the steel body 12 does not have any filter openings 14 also results in an increase in the dwell time of the hot water. More aromatics can hereby be extracted from the ground coffee or tealeaves without any blockage of the filter openings 14 occurring.

The upper margin 16 of the steel body 12 is designed in the manner of a flange and extends radially outwardly. The upper margin 16 surrounds a filling opening 28 through which ground coffee, tealeaves, or the like as well as water can be poured into the filter device $36_2$.

With reference to FIG. 3A, the upper margin 16 forms the connection section 38, with the connection section 38 having a radially outwardly facing tongue 64. Two passage openings 52 having a circular diameter are arranged on this tongue 64.

Figure 3B:
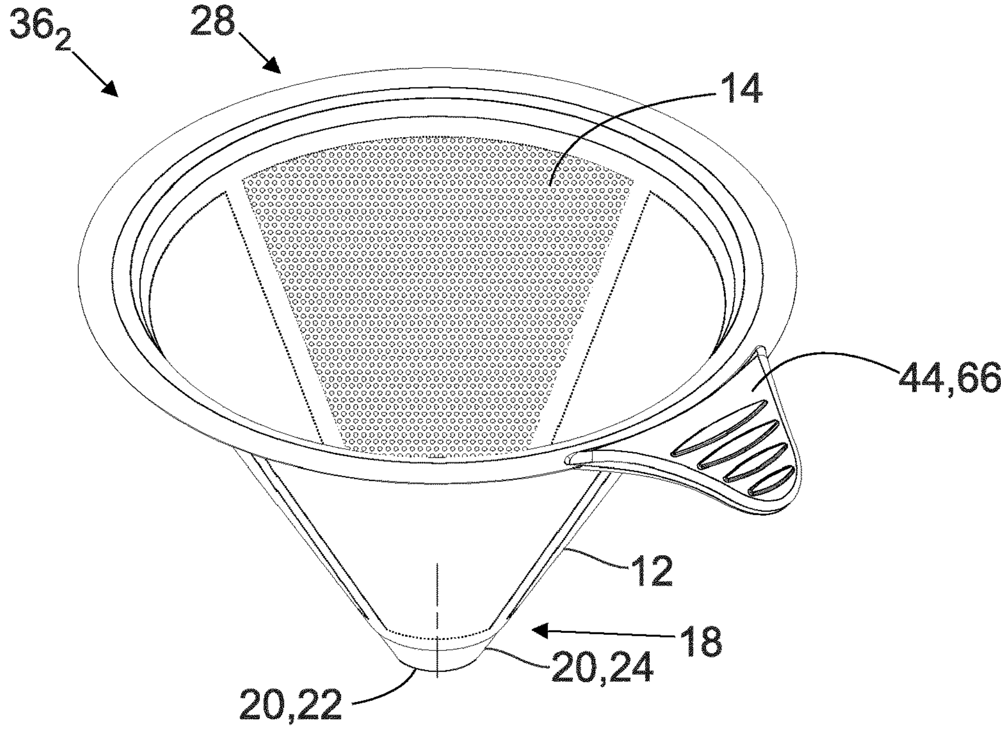
FIG. 3B is a side perspective representation of the filter device shown in FIG. 3A in a second, completed state of manufacture.

The filter device $36_2$ in accordance with the second embodiment is shown in a second, completed state in FIGS. 3B to 3D. It can be recognized that the plastic part 44 has been injected around the connection section 38. The plastic part 44 is formed in the manner of a handle piece 66 at which the filter device $36_2$ can be gripped. FIG. 3E shows the section B defined in FIG. 3D not to scale and only in general. It can be recognized that the stee body 12 has a first side 46 and a second side 48 and that the passage opening 42 passes through the steel body 12 from the first side 46 to the second side 48. The plastic part 44 is injected around the steel body 12 both at the first side 46 and at the second side 48, with the plastic part 44 completely filling the passage opening 42.

Figure 4A:
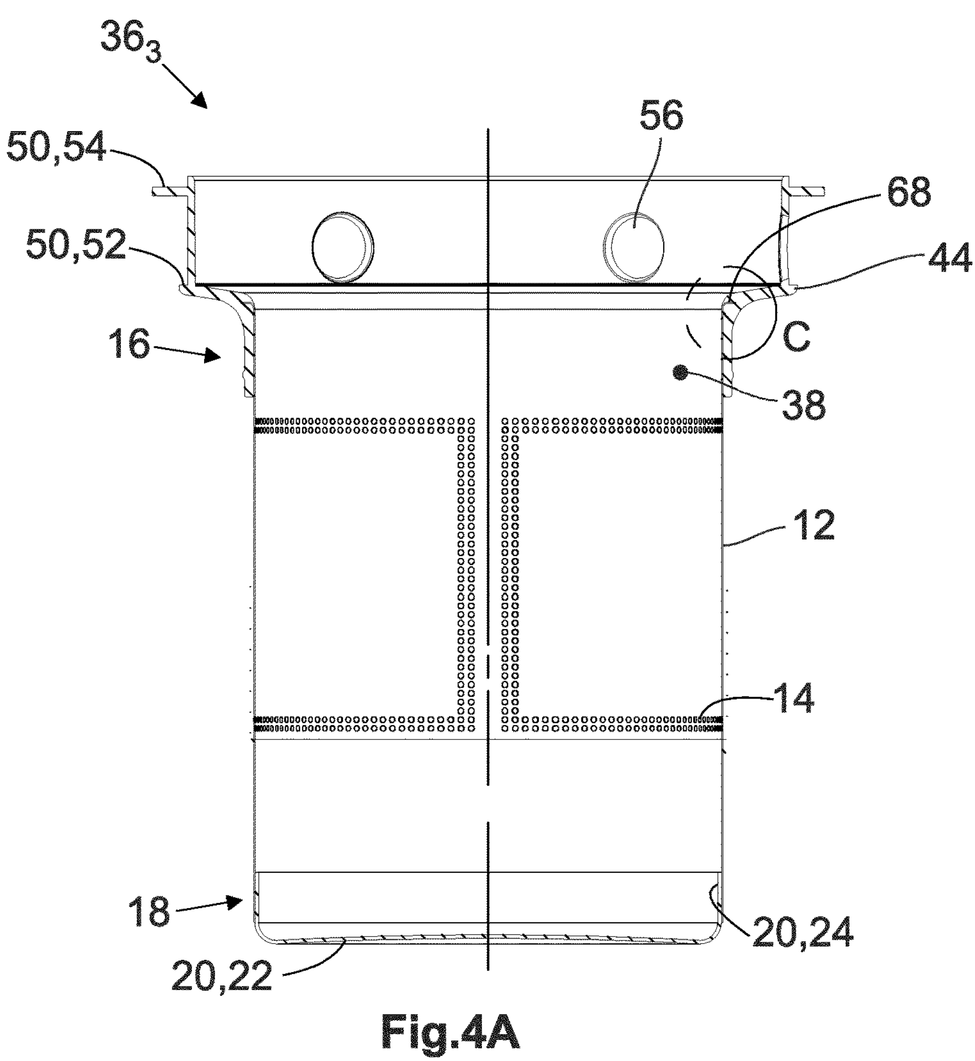
FIG. 4A is a cross-sectional representation through a third preferred embodiment of the filter device in a not yet completed state of manufacture.
Figure 4B:
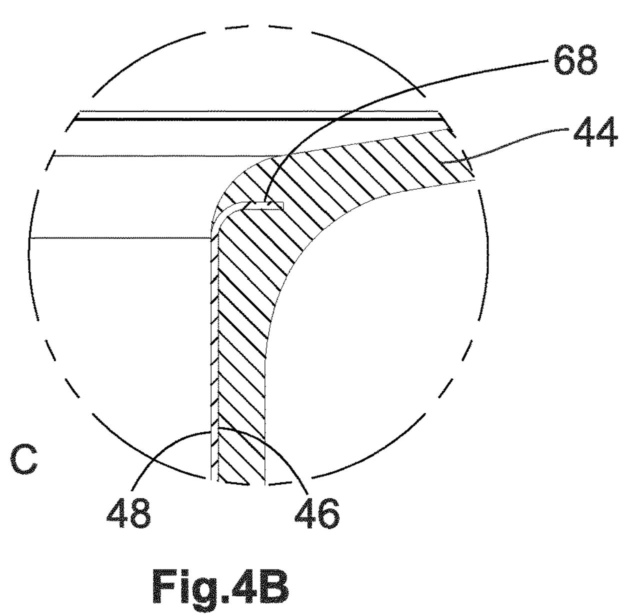
FIG. 4B is an enlarged representation of the region C marked in FIG. 4A.

The third embodiment of the filter device $36_3$ shown in FIGS. 4A and 4B largely corresponds to the first embodiment of the filter device $36_1$ shown in FIGS. 2A to 2G: Only the substantial differences will be looked at in the following to this extent. Instead of the recesses 40, the steel body 12 forms a prolongation 68 that projects radially outwardly from the remaining steel body 12, that is designed in the manner of a flange in the third embodiment of the filter device $36_3$, and that is arranged at the upper margin 16 of the steel body 12. The prolongation 68 therefore projects beyond the first side 46 of the steel body 12. The prolongation 68 Is surrounded by the plastic part 44 so that a reliable connection is produced between the steel body 12 and the plastic part 44.

The fourth embodiment of the filter device $36_4$ shown in FIGS. 5A to 5F largely corresponds to the second embodiment of the filter device $36_2$ shown in FIGS. 3A to 3E: Only the substantial differences will be looked at in the following to this extent. As can be seen from a comparison of FIGS. 3A and 5A, the filter device $36_4$ in accordance with the fourth embodiment does not have the tongue 64 that is surrounded by the plastic part 44 in the second embodiment of the filter device $36_2$ (cf. FIG. 3B). The prolongation 68 is formed by the upper margin 16 in this case and is surrounded over its full periphery by the plastic part 44, as can be seen from FIG. 5B.

Figures 5A, 5B, 5C, 5D:
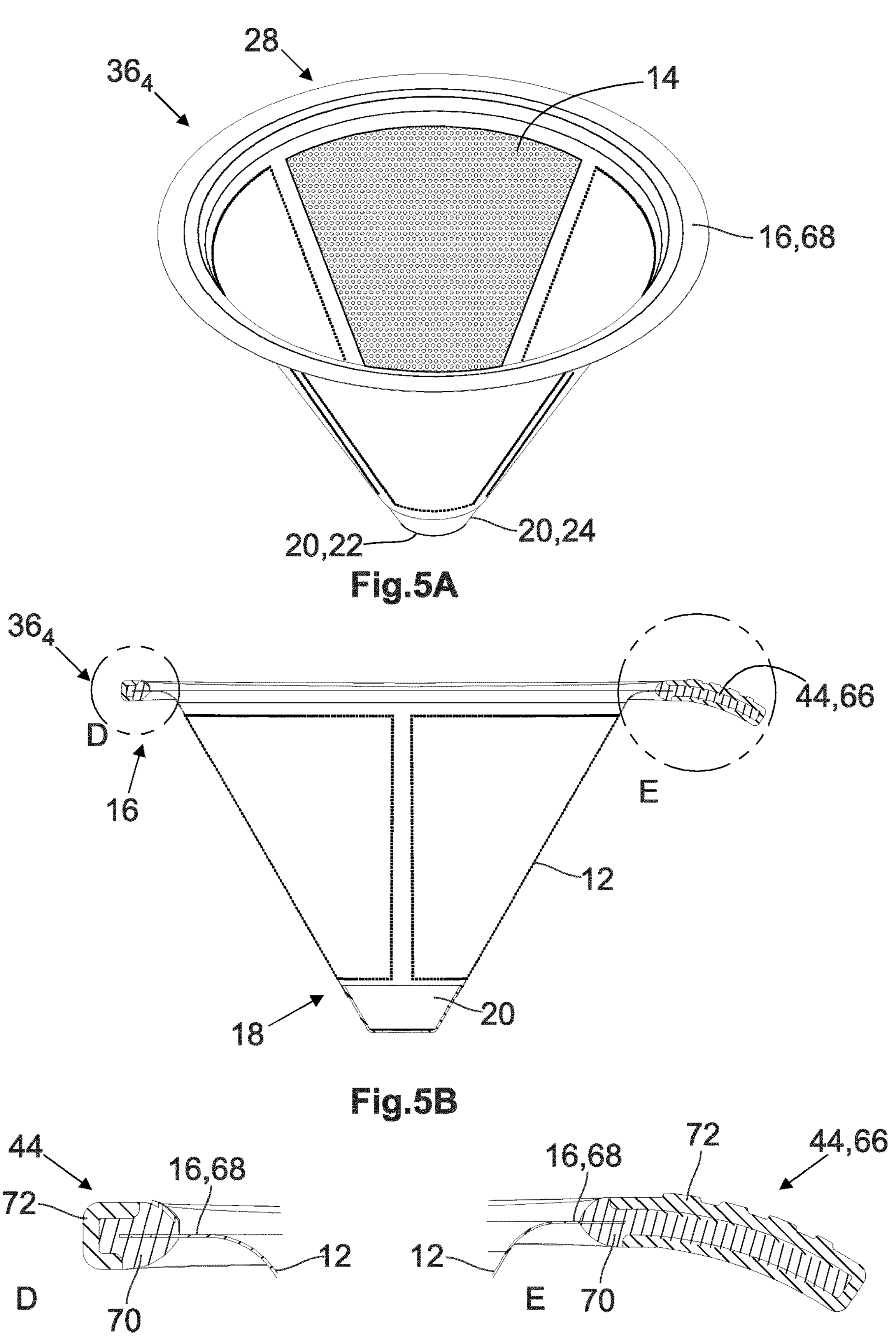
FIG. 5A is a side perspective representation of a fourth embodiment of the filter device in accordance with the preferred invention in a first state of manufacture.
FIG. 5B is a cross-sectional representation taken through the filter device shown in FIG. 5A, but in the completed state of manufacture.
FIG. 5C is an enlarged representation of the region D marked in FIG. 5B.
FIG. 5D is an enlarged representation of the region E marked in FIG. 5B.

It can in particular be seen from FIGS. 5C and 5D that the plastic part 44 comprises a first plastic 70 and a second plastic 72. The first plastic 70 here is that plastic that comes into contact with the steel body 12 and that surrounds the prolongation 68. The second plastic 72 is applied to the first plastic 70 and does not have any contact with the steel body

12 in the fourth embodiment of the filter device $36_4$. A user grips the filter device $36_4$ having the second plastic 72 using the handle piece 66.

The first plastic 70 can be a polypropylene (PP) and can have a greater hardness than the second plastic 72. The second plastic 72 can have a smaller thermal conductivity than the first plastic 70. In particular a thermoplastic elastomer (TPE) is suitable as the second plastic 72.

Figure 5E:
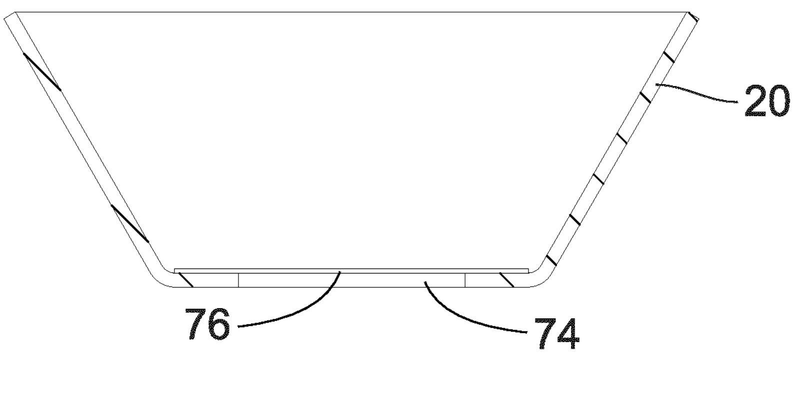
FIG. 5E is an enlarged representation of the base steel body of the filter device shown in FIG. 5A.
Figure 5F:
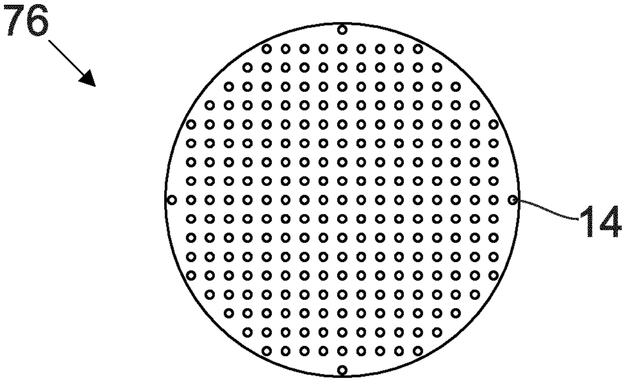
FIG. 5F is a separate plan view of a base plate of the base steel body in accordance with FIG. 5E.

The base steel body 20 of the filter device $36_3$ is shown separately in FIG. 5E. In contrast to the base steel body 20 of the filter device $36_2$ in accordance with the second embodiment, the base steel body 20 of the filter device $36_4$ in accordance with the fourth embodiment is made in two parts and forms a base opening 74 that is covered in its proper state of use by a base plate 76 that is shown separately in FIG. 5F. The base plate 76 has a plurality of filter openings 14 while the remaining base steel body 20 does not have any filter openings 14. The base plate 76 can, for example, be fixedly connected to the base steel body 20 by means of a weld seam or can only be placed on the base steel body 20. In the latter case, the base plate 76 can, for example, be removed from the base steel body 20 for cleaning purposes.

REFERENCE NUMERAL LIST

10 filter device
12 steel body
14 filter opening
16 upper margin
18 lower margin
20 base steel body
22 base wall
24 side wall
26 upper steel body
28 filling opening
30 funnel-like section
32 flange
33 plastic body
34 bulge
35 hollow space
36 filter device
$36_1$ to $36_4$ filter device
38 connection section
40 recess
42 passage opening
44 plastic part
46 first side
48 second side
50 reception section
52 lower radial expansion
54 upper radial expansion
56 aperture
58 further plastic part
60 support margin
62 projection
65 tongue
66 handle piece
68 prolongation
70 first plastic
72 second plastic
74 base opening
76 base plate
WO upper marginal width
WU lower marginal width

The invention claimed is:

1. A filter device for filtering insoluble material that is used in preparation of beverages, the filter device comprising:
 a steel body having a plurality of filter openings;
 a plastic part constructed of an injection moldable plastic that is injected around the steel body in a connection section of the steel body, wherein:
  a recess is arranged in the connection section and is at least partially filled by the plastic part; or
  the steel body in the connection section forms a prolongation that projects from the steel body and that is at least partially surrounded by the plastic part; and
 a further plastic part having a reception section for the further plastic part that is injected around the plastic part, wherein:
  the plastic part has a plurality of apertures arranged outside the steel body; and
  the further plastic part has an equal number of projections as the plurality of apertures arranged outside the steel body that are arranged adjacent to the plurality of apertures.

2. The filter device in accordance with claim 1, characterized in that the recess is formed as a passage opening completely passing through the steel body.

3. The filter device in accordance with claim 2, characterized in that
 the steel body has a first side and a second side;
 the passage opening passes through the steel body from the first side to the second side; and
 the plastic part is injected around the steel body at the first side and at the second side and completely fills the passage opening.

4. The filter device in accordance with claim 3, characterized in that
 the steel body has an upper margin and a lower margin;
 the upper margin radially outwardly projects from the steel body and surrounds a filling opening;
 the connection section is formed by the upper margin; and
 the plastic part is arranged at the upper margin.

5. The filter device in accordance with claim 4, characterized in that, the plastic part
 comprises a first plastic and a second plastic, with
 the first plastic filling the recess.

6. The filter device in accordance with claim 5, characterized in that
 the first plastic has a smaller hardness than the second plastic.

7. The filter device in accordance with claim 4, characterized in that
 the upper margin has an upper marginal width and the lower margin has a lower marginal width, with the upper marginal width being larger than the lower marginal width.

8. The filter device in accordance with claim 4, characterized in that
 a base steel body is welded to the steel body at the lower margin.

9. The filter device in accordance with claim 8, characterized in that the base steel body has a base wall and at least one side wall, with
 the base wall being provided with a plurality of filter openings.

10. The filter device in accordance with claim 2, characterized in that
 the steel body has a first side and a second side;
 the passage opening passes through the steel body from the first side to the second side; and
 the plastic part is one of:
  injected around the steel body at the first side, with the plastic part terminating flush with the second side in a region of the passage opening;
  injected around the steel body at the second side, with the plastic part terminating flush with the first side in the region of the passage opening;
  injected around the steel body at the first side and the prolongation projects over the first side; and
  injected around the steel body at the second side and the prolongation projects over the second side.

11. The filter device in accordance with claim 1, characterized in that
 the steel body has an upper margin and a lower margin;
 the upper margin surrounds a filling opening;
 the connection section is formed by the upper margin; and
 the plastic part is arranged at the upper margin.

12. The filter device in accordance with claim 11, characterized in that a closed base steel body is welded to the steel body at the lower margin.

13. The filter device in accordance with claim 1, characterized in that the plastic part is formed as a handle piece.

14. The filter device in accordance with claim 4, characterized in that, the plastic part comprises a first plastic and a second plastic, with the first plastic surrounding the prolongation and the second plastic at least partially surrounding the first plastic.

15. The filter device in accordance with claim 5, wherein the second plastic has a smaller thermal conductivity than the first plastic.

16. The filter device in accordance with claim 8, characterized in that the base steel body has a base wall and at least on side wall, the base wall surrounding a base opening that is covered by a base plate having a plurality of filter openings.

17. The filter device in accordance with claim 1, characterized in that the plastic part forms a handle piece.

* * * * *